US008954256B2

(12) United States Patent
Isaji et al.

(10) Patent No.: US 8,954,256 B2
(45) Date of Patent: Feb. 10, 2015

(54) VEHICLE-USE SPEED CONTROL APPARATUS

(75) Inventors: Kazuyoshi Isaji, Kariya (JP); Naohiko Tsuru, Handa (JP)

(73) Assignee: Denso Corporation, Kariya (JP)

( * ) Notice: Subject to any disclaimer, the term of this patent is extended or adjusted under 35 U.S.C. 154(b) by 360 days.

(21) Appl. No.: 13/068,473

(22) Filed: May 12, 2011

(65) Prior Publication Data

US 2011/0282559 A1   Nov. 17, 2011

(30) Foreign Application Priority Data

May 13, 2010  (JP) .................................. 2010-111414
Oct. 19, 2010  (JP) .................................. 2010-234694

(51) Int. Cl.
  *G08G 1/16*  (2006.01)
  *B60W 30/16*  (2012.01)
  (Continued)

(52) U.S. Cl.
  CPC ............... *B60W 30/16* (2013.01); *G08G 1/163* (2013.01); *B60W 30/146* (2013.01);
  (Continued)

(58) Field of Classification Search
  USPC .......... 180/167, 169, 170, 179, 271; 340/435, 340/436; 342/27, 70, 69; 700/304; 701/1, 701/25, 301, 31.4, 33.4, 36, 41, 431, 70, 93, 701/96; 123/319, 349, 370, 371
  See application file for complete search history.

(56) References Cited

U.S. PATENT DOCUMENTS 6,226,588 B1 *  5/2001  Teramura et al. ................ 701/93
6,459,983 B1 * 10/2002  Lichtenberg et al. ........... 701/96

(Continued)

FOREIGN PATENT DOCUMENTS

JP    06-297982   10/1994
JP    2002-074598   3/2002
(Continued)

OTHER PUBLICATIONS

JP 2007 153080 Specification and Claims (machine translation).*
(Continued)

*Primary Examiner* — Fadey Jabr
*Assistant Examiner* — Kevin P Mahne
(74) *Attorney, Agent, or Firm* — Harness, Dickey & Pierce, PLC

(57) ABSTRACT

The vehicle-use speed control apparatus sets a virtual preceding vehicle assumed to run at a target speed at a predetermined initial distance ahead of the own vehicle when the brake pedal is operated causing a relative speed between the actual vehicle speed and the target speed exceeds a predetermined value, calculates an initial value of a performance index for approach and alienation based on the initial distance and the target speed. Thereafter, the vehicle-use speed control apparatus repeatedly calculates a following distance to the virtual preceding vehicle based on a time elapsed from when a speed control start condition is satisfied, the current relative speed and the initial distance, and a target relative speed based on the initial distance, the initial value of the performance index and the following distance, and controls the vehicle speed based on the difference between the target relative speed and the actual relative speed.

10 Claims, 11 Drawing Sheets

(51) Int. Cl.
*B60W 30/14* (2006.01)
*B60W 30/165* (2012.01)

(52) U.S. Cl.
CPC .............. *B60W 30/162* (2013.01); *G08G 1/16* (2013.01); *B60W 30/165* (2013.01); *B60W 30/143* (2013.01); *B60W 2520/10* (2013.01); *B60W 2550/302* (2013.01); *B60W 2550/308* (2013.01); *B60W 2720/106* (2013.01)
USPC .............. 701/96; 701/93; 340/435; 340/436; 123/349; 123/370; 123/371; 180/169; 180/170; 180/271; 700/304

(56) References Cited

U.S. PATENT DOCUMENTS

| | | | |
|---|---|---|---|
| 7,519,471 B2* | 4/2009 | Shibata et al. | 701/523 |
| 2002/0055813 A1* | 5/2002 | Adachi et al. | 701/96 |
| 2002/0069010 A1* | 6/2002 | Nishira et al. | 701/96 |
| 2002/0134602 A1* | 9/2002 | Kobayashi et al. | 180/169 |
| 2003/0187578 A1* | 10/2003 | Nishira et al. | 701/301 |
| 2003/0236624 A1* | 12/2003 | Kimura et al. | 701/301 |
| 2004/0093145 A1* | 5/2004 | Tanimichi et al. | 701/93 |
| 2007/0005218 A1* | 1/2007 | Ueyama | 701/96 |
| 2008/0288152 A1* | 11/2008 | Isaji et al. | 701/96 |
| 2009/0093938 A1* | 4/2009 | Isaji et al. | 701/96 |
| 2010/0179741 A1* | 7/2010 | Pelosse | 701/96 |

FOREIGN PATENT DOCUMENTS

| | | |
|---|---|---|
| JP | 2002-316552 | 10/2002 |
| JP | 2007-008298 | 1/2007 |
| JP | 2007-145095 | 6/2007 |
| JP | 2007-153080 | 6/2007 |
| JP | 2007153080 A * | 6/2007 |
| JP | 2010-215081 | 9/2010 |
| JP | 2010-264776 | 11/2010 |
| JP | WO2010/131542 | 11/2010 |

OTHER PUBLICATIONS

Office action dated Jun. 12, 2012 in corresponding Japanese Application No. 2010-234694.

* cited by examiner

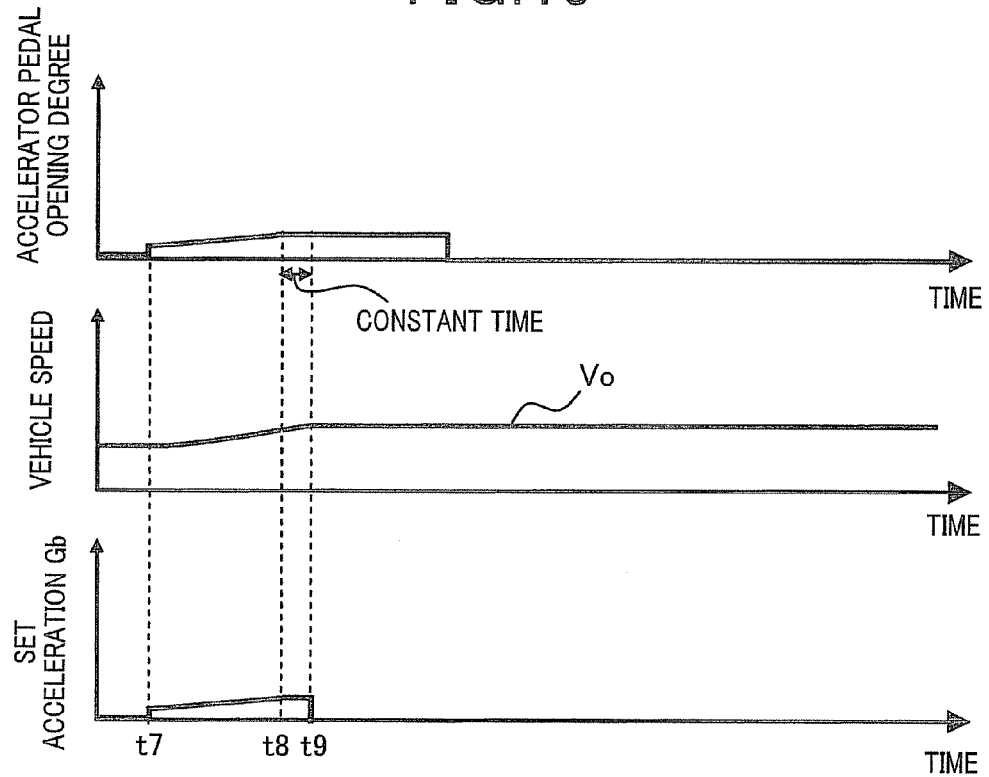

VEHICLE-USE SPEED CONTROL APPARATUS

This application claims priority to Japanese Patent Applications No. 2010-111414 filed on May 13, 2010, and No. 2010-234694 filed on Oct. 19, 2010, the entire contents of which are hereby incorporated by reference.

BACKGROUND OF THE INVENTION

1. Field of the Invention

The present invention relates to a vehicle-use speed control apparatus.

2. Description of Related Art

There are known various vehicle-use speed control apparatuses including ones configured to perform speed control of a vehicle on which the vehicle-use speed control apparatus is mounted (may be referred to as "the own vehicle" hereinafter) in accordance with a performance index representing a state of approach or alienation (separation) between the own vehicle and a preceding vehicle (may be referred to simply as "performance index" hereinafter), and a relational expression of performance index for approach and alienation, showing a relationship between the distance to the preceding vehicle and the relative speed between the own vehicle and the preceding vehicle. The relational expression makes an absolute value of the performance index to increase with the increase of the relative speed, and makes the increase slope of the performance index to increase with the decrease of the distance between the own vehicle and the preceding vehicle for the same relative speed. For example, refer to Japanese Patent Application Laid-open No. 2008-74378 (Patent document 1) and Japanese Patent Application Laid-open No. 2008-280017 (Patent document 2).

In the apparatus described in Patent document 1, the value of the performance index for approach and alienation at the moment when deceleration control is started is calculated as an initial value KdB_0 based on the calculation formula (1) shown below, and the relative speed Vr and the distance D to a preceding vehicle (may be referred to as the following distance D, or the relative distance D hereinafter) at the moment of start of the deceleration control.

$$KdB = 10 \times \log_{10}\left(\frac{|-2 \times Vr|}{D^3 \times 5 \times 10^{-8}}\right) \quad (1)$$

Subsequently, a target value calculation formula is used so as to calculate a target value KdB_t of the performance index for approach and alienation from the following distance D based on the initial value KdB_0. The value of this target calculation formula increases with the decrease of the following distance D from the initial value KdB_0 at a constant slope.

The apparatus described in Patent document 2 uses a compensated performance index KdB_c of approach and alienation obtained by correcting the performance index KdB of approach and alienation based on the speed of a forward object such as a preceding vehicle. The apparatus described in Patent document 2 is configured to calculate a target relative speed Vr_c_t based on the following distance Dp and the compensated performance index KdB_c_t, and calculate a target acceleration GDp based on the target relative speed Vr_c_t and the actual relative speed Vr_c_p.

Using the above performance index KdB or compensated performance index KdB_c of approach and alienation in performing the speed control enables smooth and comfortable speed control of the own vehicle.

There is also known a vehicle-use speed control apparatus configured to control the speed of the own vehicle to a target speed determined based on the operation states of the accelerator and brake of the own vehicle. For example, refer to Japanese Patent Application Laid-open No. H11-348601. The apparatus disclosed in Patent document 3 is for controlling the speed of the own vehicle such that the difference between the actual speed and a target speed becomes 0, the target speed being calculated by a target speed calculation means based on the accelerator opening degree and the brake pressing force. In other words, the apparatus disclosed in Patent document 3 determines a target driving force (target acceleration) and a target brake force (target deceleration) directly from the vehicle driver's operation of the accelerator pedal and the brake pedal, so that vehicle driver's intention of acceleration and deceleration can be faithfully implemented as the vehicle movement.

However, in the apparatus disclosed in Patent document 3, if the vehicle driver's operation of the accelerator or brake is poor, the vehicle movement implemented by the speed control may become awkward.

On the other hand, the apparatuses disclosed in Patent documents 1 and 2 both need to detect the following distance D (the distance to a preceding vehicle), because they use the performance index KdB or compensated performance index KdB_c of approach and alienation. This raises a problem that when there is no vehicle preceding the own vehicle, it is not possible to perform the acceleration/deceleration control.

SUMMARY OF THE INVENTION

A embodiment provides a vehicle-use speed control apparatus configured to perform speed control of an own vehicle on which the vehicle-use speed control apparatus is mounted in accordance with a performance index for approach and alienation representing a state of approach and alienation between the own vehicle and a preceding vehicle, and a relational expression of performance index for approach and alienation, the relational expression showing a relationship between a following distance to the preceding vehicle and an approach speed between the own vehicle and the preceding vehicle, the relational expression making an absolute value of the performance index to increase with increase of the approach speed, and making slope of the performance index steeper with decrease of the following distance for a same value of the approach speed, the vehicle-use speed control apparatus comprising:

a target speed setting means to set a target speed of the own vehicle;

a relative speed calculating means to repeatedly calculate a current value of a relative speed between the target speed and a current speed of the own vehicle;

an index initial value calculating means to calculate an initial value of the performance index based on the current value of the relative speed, an initial following distance to a virtual preceding vehicle and the performance index when a predetermined speed control start condition is satisfied;

a following distance calculating means to repeatedly calculate a current value of the following distance to the virtual preceding vehicle based on the current value of the relative speed, a time elapsed from a time when the predetermined speed control start condition was satisfied and the initial following distance to the virtual preceding vehicle;

a target relative speed calculating means to repeatedly calculate a target value of the relative speed as a target relative speed based on the current value of the following distance calculated by the following distance calculating means, the initial value of the performance index calculated by the index initial value calculating means and the initial following distance to the virtual preceding vehicle; and a speed control means to perform speed control of the own vehicle based on the target relative speed and the current value of the relative speed.

According to the present invention, there is provided a vehicle-use speed control device capable of controlling the speed of a vehicle smoothly and comfortably for the vehicle driver even when no preceding vehicle is present.

Other advantages and features of the invention will become apparent from the following description including the drawings and claims.

BRIEF DESCRIPTION OF THE DRAWINGS

In the accompanying drawings:

FIG. 15 is a graph showing variations of the various values related to another example of the control for achieving the set acceleration Gb.

PREFERRED EMBODIMENTS OF THE INVENTION

First Embodiment

Figure 1:
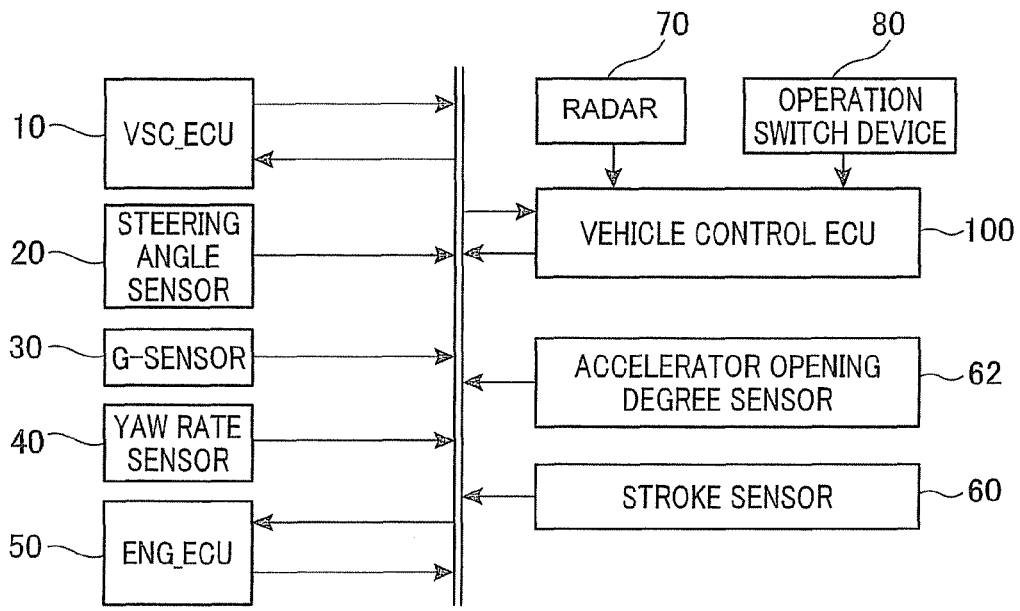
FIG. 1 is a diagram showing the overall structure of a drive support system including a vehicle control ECU 100 according to an embodiment of the invention.

FIG. 1 is a diagram showing the overall structure of a drive support system including a vehicle control ECU 100 according to an embodiment of the invention. As shown in FIG. 1, the drive support system includes a VSC_ECU 10, a steering angle sensor 20, a G-sensor 30, a yaw rate sensor 40, an ENG_ECU 50, a stroke sensor 60, and accelerator opening degree sensor 62, a radar 70, an operation switch device 80 and the vehicle control ECU 100.

The VSC_ECU 10, which is for controlling a brake actuator (not shown) to apply a brake force to a vehicle on which the drive support system is mounted (may be referred to as the vehicle or the own vehicle hereinafter), includes a VSC (Vehicle Stability Control: registered trade mark) function to restrict the vehicle from skidding. The VSC_ECU 10 receives information regarding a target deceleration from an in-vehicle LAN, and controls the brake actuator in order that the vehicle decelerates at this target deceleration. The VSC_ECU 10 also transmits information regarding the vehicle speed (the speed of the vehicle) Vo and the brake pressure to the in-vehicle LAN.

The steering angle sensor 20, which is for detecting the steering angle of the vehicle, transmits information regarding the detected steering angle to the in-vehicle LAN.

The G-sensor 30, which is for detecting the longitudinal G (the acceleration of the vehicle in the longitudinal direction), and the lateral G (the acceleration of the vehicle in the lateral direction), transmits information regarding the detected longitudinal G and lateral G to the in-vehicle LAN. The yaw rate sensor 40, which is for detecting the yaw rate of the vehicle (the angular velocity around the vertical axis of the vehicle), transmits the detected yaw rate to the in-vehicle LAN.

The ENG_ECU 50 receives information regarding a target acceleration from the in-vehicle LAN, and controls a throttle actuator (not shown) so that the vehicle accelerates at the target acceleration. The stroke sensor 60 is for detecting a stroke of a brake pedal (not shown) depending on the depression amount of the brake pedal as one of pedal-related variables. The accelerator opening degree sensor 62 is for detecting the opening degree of an accelerator pedal (not shown) as one of the pedal-related variables.

The radar 70 is configured to emit a laser light, for example to within a predetermined forward range, receive a reflected version of the laser light in order to detect a distance to a preceding vehicle (may be referred to as the following distance or relative distance hereinafter), a relative speed with the preceding vehicle, a lateral shift with the preceding vehicle (a lateral distance between the center axis of the own vehicle and the center axis of the preceding vehicle), and outputs the detection results to the vehicle control ECU 100.

The operation switch device 80, which includes a group of switches operated by the vehicle driver, outputs information regarding the vehicle driver's operation of these switches. The vehicle control ECU 100, which is a microcomputer-based unit, includes a CPU, a ROM, a RAM, an I/O and a bus connecting these components.

The vehicle control ECU 100 performs speed control which is smooth and comfortable for the vehicle driver by setting a virtual preceding vehicle ahead of the own vehicle.

Figure 2:
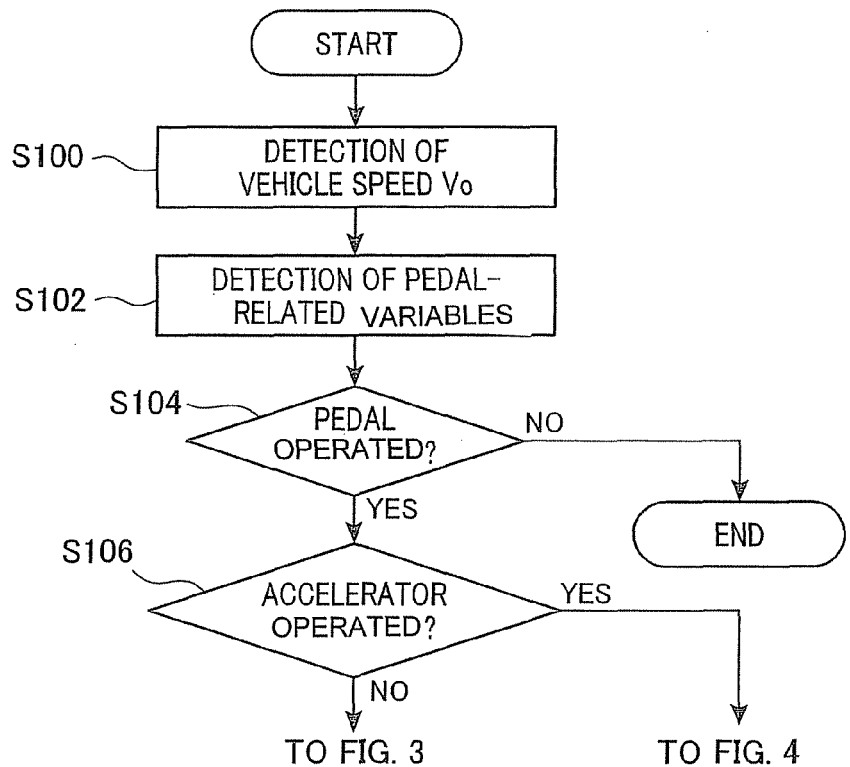
FIG. 2 is a flowchart showing the speed control performed by the vehicle control ECU 100.

FIG. 2 is a flowchart showing the speed control performed at regular time intervals by the vehicle control ECU 100

This speed control begins by detecting the current vehicle speed Vo of the own vehicle in step S100. Subsequently, the pedal-related variables are detected in step S102. More specifically, the stroke amount of the brake pedal is detected based on the output signal of the stroke sensor 60, and the accelerator pedal opening degree is detected based on the output signal of the accelerator opening degree sensor (referred to as the accelerator sensor hereinafter) 62.

In subsequent step S104, it is determined whether or not the brake pedal or the accelerator pedal has been operated. This determination is made based on the difference between the previously detected pedal-related value and the currently detected pedal-related value.

If the determination result in step S104 is negative the control is terminated. If the determination result in step S104 is affirmative the control proceeds to step S106 to determine whether the operation detected in step S104 is an operation of the accelerator pedal. If the determination result in step S106 is affirmative, the control proceeds to the acceleration control process shown in FIG. 4, and otherwise proceeds to the deceleration control process shown in FIG. 3.

Figure 3:
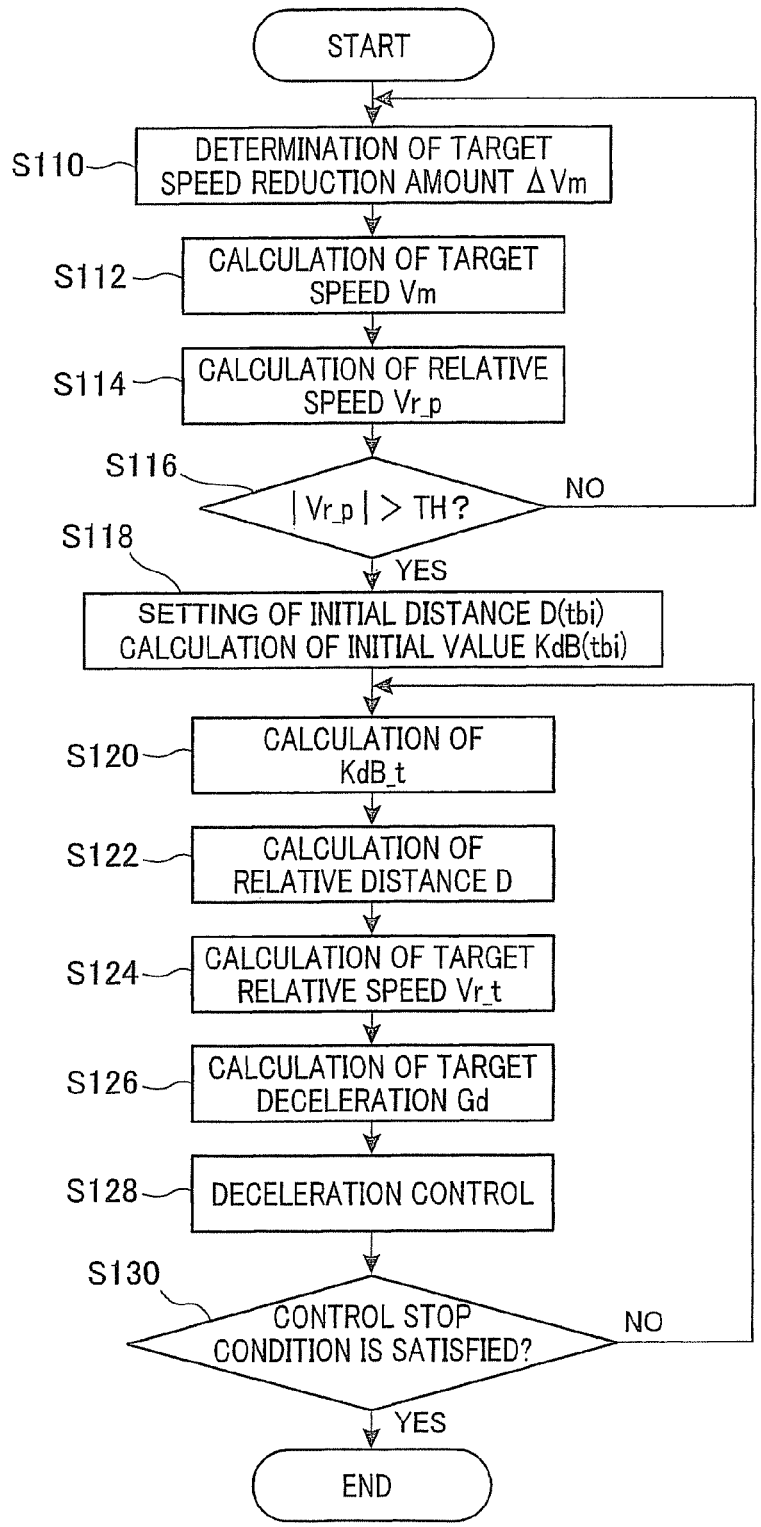
FIG. 3 is a flowchart showing a deceleration control process performed if the determination result in step S106 of the speed control shown in FIG. 2 is negative (when a brake operation is performed)

First, explanation is made for the deceleration control process shown in FIG. 3. If the determination result in step S106 is negative, that is, when a brake operation has been performed, the control proceeds to step S110 shown in FIG. 3 to detect the stroke amount of the brake pedal, and to determine a target speed reduction amount ΔVm based on the detected stroke amount and a pre-stored relationship between the stroke of the brake pedal and the target speed reduction amount ΔVm. The target speed reduction amount ΔVm represents an amount of speed reduction by which the current vehicle speed Vo should be reduced.

In subsequent step S112, a target speed Vm (=V0−ΔVm) is calculated by subtracting the target speed reduction amount ΔVm from the current vehicle speed Vo.

In subsequent step S114, the current relative speed Vr_p (=Vm−Vo) is calculated by subtracting the current vehicle speed Vo detected in step S100 from the target speed Vm calculated in step S112.

In subsequent step S116, it is determined whether or not the current relative speed Vr_p calculated in step S114 has changed more than a predetermined threshold TH. This threshold TH is set to such a value (5 km/h, for example) as to enable making a determination that a significant difference has occurred between the target speed Vm and the current vehicle speed Vo due to the vehicle driver's operation of the brake pedal.

If the determination result in step S116 is negative, the control returns to step S110 to update the target speed Vm and the current relative speed Vr_p, and then proceeds to step S116 again. If the determination result in step S116 is affirmative, the control proceeds to step S118 to start the deceleration control. Although not shown in FIG. 3, if steps S114 and S116 have been performed a predetermined number of times, the process shown in FIG. 3 is terminated.

In step S118, an initial distance $D(t_{bi})$ as an initial value of the relative distance D to a virtual preceding vehicle set for calculation of a performance index KdB of approach and alienation, and an initial value KdB $(t_{bi})$ of the performance index KdB of approach and alienation (may be referred to simply as the performance index KdB hereinafter) are calculated. In this embodiment, the initial distance $D(t_{bi})$ is a predetermined constant value of 50 m. The initial value KdB $(t_{bi})$ of the performance index KdB is calculated by substituting the initial distance $D(t_{bi})$ and the current relative speed Vr_p calculated in step S114 as an initial value of the relative speed into the following expression (2). The steps subsequent to step S118 are performed on the assumption that the virtual preceding vehicle runs at the target speed Vm calculated in step S112.

$$KdB = 10 \times \log_{10}\left(\left|-4 \times 10^7 \times \frac{Vr}{D^3}\right|\right)\text{sgn}(-Vr) \quad (2)$$

In subsequent step S120, the target value KdB_t of the performance index KdB is calculated. The target value KdB_t, which is a function of the relative distance D, is a tangent of a relational expression of the performance index for approach and alienation at the initial distance $D(t_{bi})$. A method of obtaining the tangent is explained in detail below.

Figure 6:
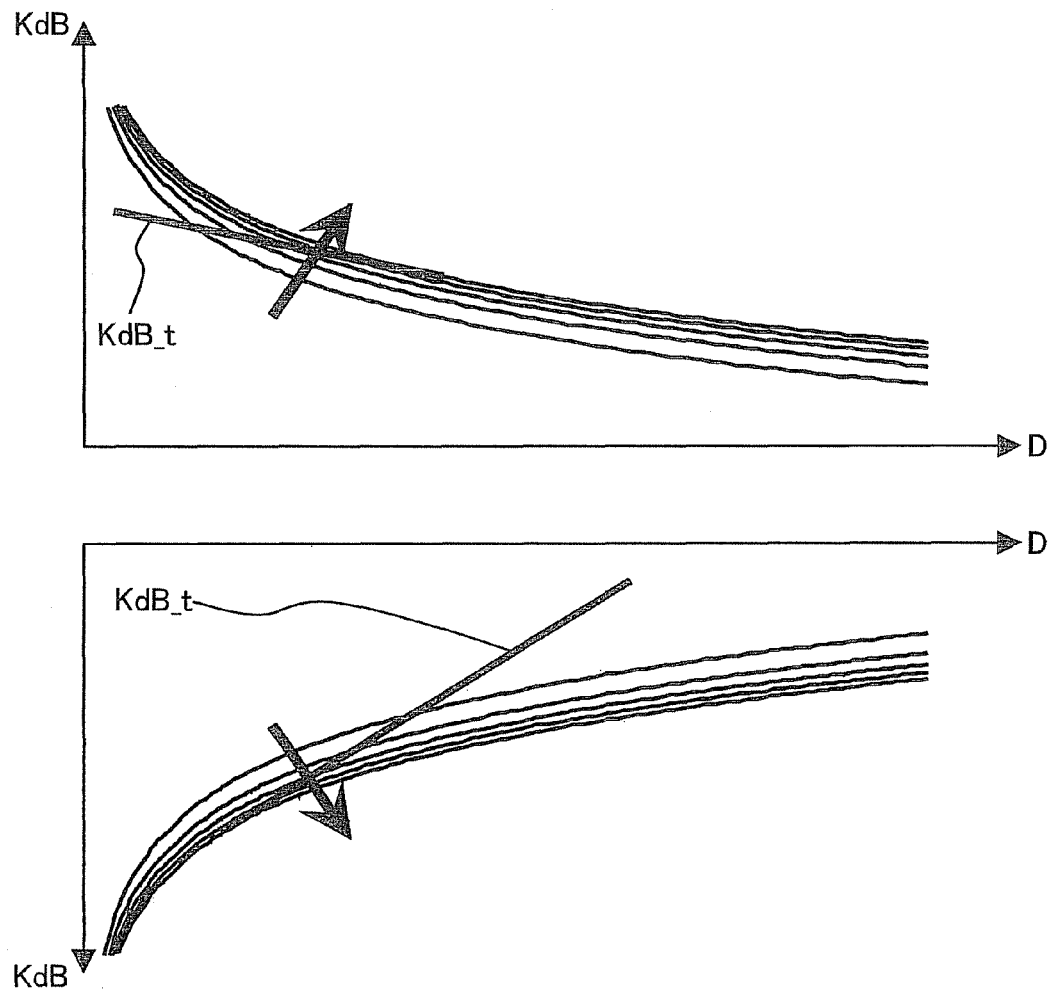
FIG. 6 is a diagram in which there is shown, for each of different relative speeds, a curve (the first quadrant) represented by a relational expression of a performance index for approach and alienation when the deceleration control process is performed, and a curve (the fourth quadrant) represented by the relational expression of the performance index for approach and alienation when the acceleration control process is performed.

As described above, the target value KdB_t is a tangent of the relational expression of the performance index for approach and alienation (may be referred to simply as "the performance index relational expression" hereinafter) at the initial distance $D(t_{bi})$. The performance index relational expression is shown in the foregoing expression (2). When the vehicle is decelerating, since the relative speed Vr<0, the performance index relational expression is as shown by the graph in the upper section (the first quadrant) of FIG. 6. This graph represents a relationship between the relative distance D and the performance index KdB for each of different values of the relative speed Vr. The direction of the arrow A shows a direction in which the relative speed Vr increases. As seen from this graph, the increase slope of the performance index KdB becomes steeper with the decrease of the relative distance D, and the performance index KdB becomes larger with the increase of the absolute value of the relative speed Vr. In this graph, also a straight line representing the target value KdB_t is shown. As seen from this straight line, the target value KdB_t increases at a constant slope with the decrease of the relative distance D when the deceleration control is performed.

The slope of this straight line is determined as follows. In view of that the relative speed Vr<0 while the vehicle is decelerating, the expression (2) is transformed into the following expression (3).

$$KdB = 10 \times \log_{10}\left(\left|-4 \times 10^7 \times \frac{Vr}{D^3}\right|\right) \quad (3)$$
$$= 10 \times \log_{10}(4 \times 10^7) + 10 \times \log_{10}Vr + 10 \times \log_{10}\frac{1}{D^3}$$
$$= 10 \times \log_{10}(4 \times 10^7) + 10 \times \log_{10}Vr - 30 \times \log_{10}D$$

By differentiating the expression (3) with respect to the distance, and substituting the initial distance $D(t_{bi})$, the slope of the tangent can be obtained as the following expression (4).

$$\frac{dKdB}{dD} = \frac{d}{dD}\{10 \times \log_{10}(4 \times 10^7) + 10 \times \log_{10}Vr - 30 \times \log_{10}D(t_{bi})\} \quad (4)$$
$$= \frac{d}{dD}(-30 \times \log_{10}D(t_{bi}))$$
$$= -30 \times \frac{d}{dD}(\log_{10}D(t_{bi}))$$

-continued $$= -30 \times \frac{d}{dD}\left(\frac{\ln D(t_{bi})}{\ln 10}\right)$$

$$= -30 \times \frac{1}{\ln 10} \times \frac{d}{dD}(\ln D(t_{bi}))$$

$$= -30 \times \frac{1}{\ln 10} \times \frac{1}{D(t_{bi})}$$

$$= -13.03 \times \frac{1}{D(t_{bi})}$$

When the initial value of the performance index KdB at the initial distance $D(t_{bi})$ is KdB $(t_{bi})$, the intercept of the tangent is shown by the following expression (5).

$$y\text{-intercept} = KdB(t_{bi}) + 13.03 \times \frac{1}{D(t_{bi})} \times D(t_{bi}) \quad (5)$$

$$= KdB(t_{bi}) + 13.03$$

Accordingly, the target value KdB_t of the performance index KdB when the deceleration control is performed is shown by the following expression (6).

$$\text{KdB\_t} = -13.03 \times \frac{1}{D(t_{bi})} \times D + KdB(t_{bi}) + 13.03 \quad (6)$$

After the target value KdB_t of the performance index B is obtained, the process proceeds to step S122 to calculate the current relative distance D to the virtual preceding vehicle. A method of calculating the relative distance D is explained in detail in the following. The relative distance D is calculated from the current relative speed Vr_p. The current relative speed Vr_p is calculated in the same way as that used in step S114. As described in the foregoing, it is assumed that the virtual preceding vehicle rims at the target speed Vm. Accordingly, the relative distance D(t) can be calculated as follows. First, a variation ΔD(t) of the relative distance D is calculated by integrating the relative speed Vr_p from a time at which the speed control start condition is satisfied (the determination result in step S116 becomes affirmative) to the current time. Subsequently, the current relative distance D(t) is calculated by subtracting the variation ΔD(t) from the initial distance $D(t_{bi})$ set in step S118.

In subsequent step S124, a target relative speed Vr_t is calculated. The target relative speed Vr_t is a function of the relative distance D. A method of calculating the target relative speed Vr_t is explained in detail in the following.

By transforming the performance index relational expression (2), the relative speed when the deceleration control is performed is given by the following expression (7).

$$KdB = 10 \times \log_{10}\left(\left|-4 \times 10^7 \times \frac{Vr}{D^3}\right|\right) \quad (7)$$

$$10^{\frac{KdB}{10}} = -4 \times 10^7 \times \frac{1}{D^3} \times Vr$$

$$Vr = -2.5 \times D^3 \times 10^{\frac{KdB}{10}-8}$$

By substituting the expression (6) into the expression (7), the target relative speed Vr_t can be calculated based on the relative distance D in accordance with the following expression (8).

$$Vr\_t = -2.5 \times D^3 \times 10^{\left(\frac{KdB\_t}{10}-8\right)} \quad (8)$$

$$= -2.5 \times D^3 \times 10^{\left(\frac{-13.03 \times \frac{1}{D(t_M)} \times D + KdB(t_M) + 13.03}{10}-8\right)}$$

$$= -2.5 \times D^3 \times 10^{\left(-1.303 \times \frac{1}{D(t_M)} \times D + \frac{KdB(t_M)}{10}-6.697\right)}$$

By substituting the current relative distance D calculated in step S122 into the expression (8), the target relative speed Vr_t can be obtained.

In subsequent step S126, a target deceleration Gd is calculated in accordance with the following expression (9). In the expression (9), Vr_t is the target relative speed, Vr_p is the current relative speed, and Td is a predetermined fixed time.

$$Gd = \frac{Vr\_p - Vr\_t}{Td} \quad (9)$$

Figure 7:
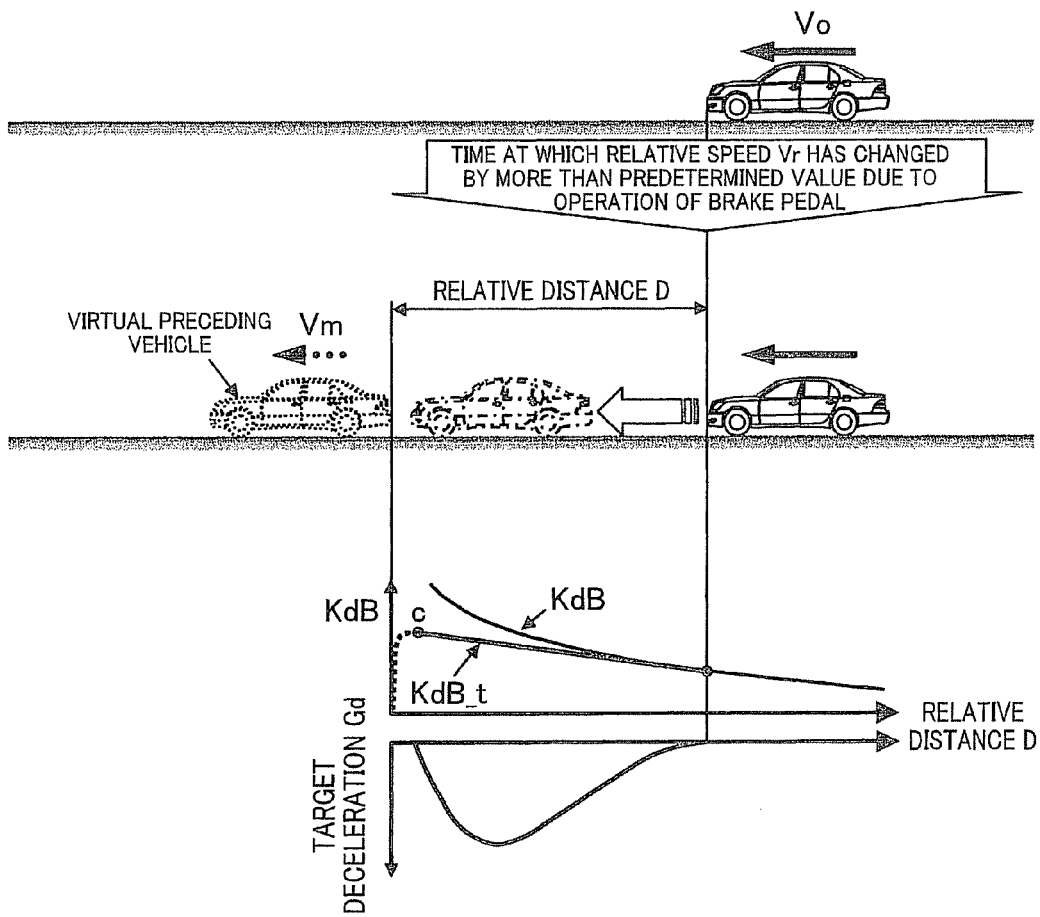
FIG. 7 is a diagram showing variations of a target deceleration Gd and a target value KdB_t of the performance index for approach and alienation with respect to the relative distance D.

As explained above, the target deceleration Gd is calculated based on the target relative speed Vr_t, and the target relative speed Vr_t is calculated based on the target value KdB_t of the performance index KdB. FIG. 7 shows variations of the target deceleration Gd and the target value KdB of the performance index KdB with respect to the relative distance D. As shown in FIG. 7, the target deceleration Gd is represented by a curve with a downward convexity. In FIG. 7, the target value KdB_t is represented by a broken line within the range where the relative distance D is closer to 0 than the point c. The vehicle control ECU 100 does not perform the speed control within this range. In this embodiment, the vehicle control ECU 100 stops performing the speed control when the relative speed becomes 1 km/h. The point c is an intersection between the curve representing the performance index KdB when the relative speed is 1 km/h and the expression (6).

In subsequent step S128, the brake force is controlled such that the actual deceleration detected by the G-sensor 30 agrees with the target deceleration Gd calculated in step S126. Incidentally, the brake force may be generated by operating the brake actuator or engine brake. The brake force is determined using a map defining a relationship between the target deceleration Gd and the brake force.

In subsequent step S130, it is determined whether or not a control termination condition is satisfied. In this embodiment, the control termination condition is that the relative speed Vr_p, that is, the difference between the vehicle speed Vo and the target vehicle speed Vm becomes smaller than the predetermined speed (1 km/h). However, the control termination condition may be that the performance index KdB decreases below the target value KdB by more than a predetermined value. If the determination result in step S130 is negative, the process returns to step S120 to continue the deceleration control. If the determination result in step S130 is negative, the process is terminated.

Figure 4:
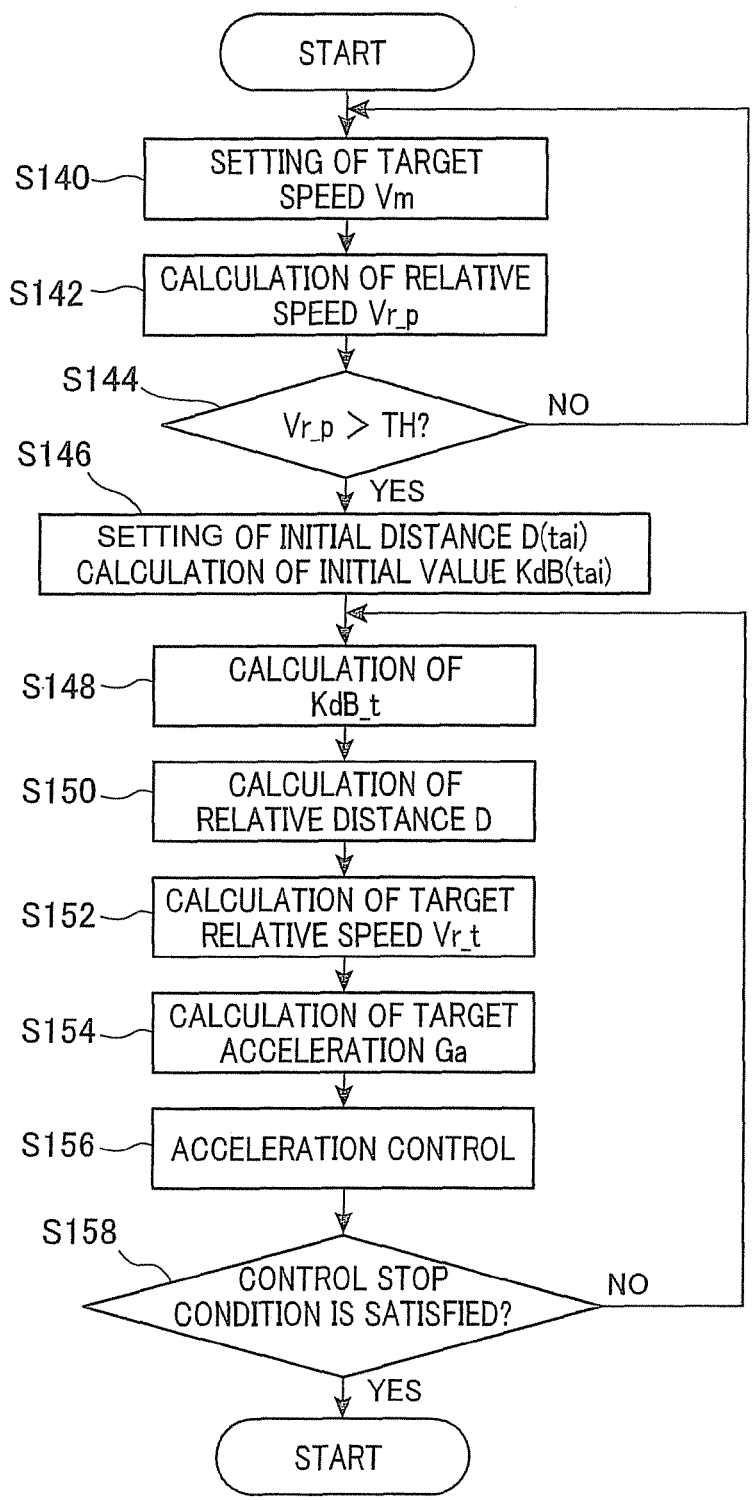
FIG. 4 is a flowchart showing an acceleration control process performed if the determination result in step S106 of the speed control shown in FIG. 2 is affirmative (when an accelerator operation is performed)
Figure 8:
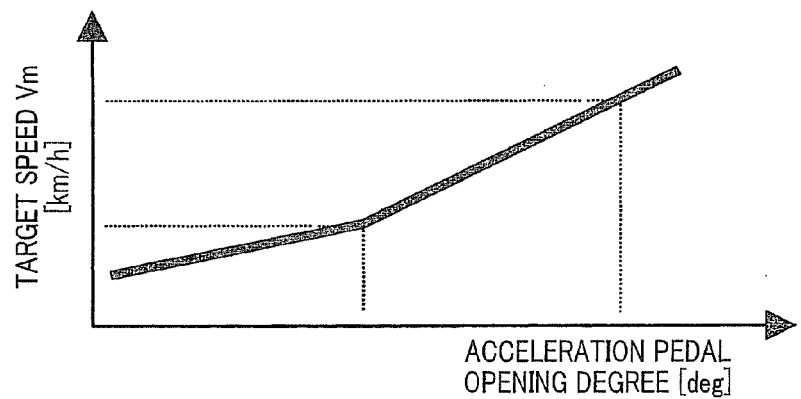
FIG. 8 is a diagram showing a relationship between an accelerator pedal opening degree and a target speed Vm of the vehicle.

Next, the acceleration control process shown in FIG. 4 performed when the determination result in step S106 shown in FIG. 2 is affirmative (that is, an operation of the accelerator is performed) is explained. This acceleration control process begins in step S140 to set the target speed Vm based on the current accelerator opening degree and the relationship between the accelerator opening degree and the target speed Vm shown in FIG. 8. The relationship shown in FIG. 8 is determined in advance through experiments.

In subsequent step S142, the current relative speed Vr_p (=Vm−Vo) is calculated by subtracting the vehicle speed Vo detected in step S100 from the target speed Vm set in step S140.

In subsequent step S144, it is determined whether or not the current relative speed Vr_p has changed by more than the threshold TH. This threshold TH is set to 5 km/h, for example.

If the determination result in step S144 is negative, the control proceeds to step S140 to update the target speed Vm and the current relative speed Vr_p, and then proceeds to step S144 again. If the determination result in step s144 is affirmative, the process proceeds to step S146. Although not shown in FIG. 4, if steps S142 and S144 have been performed a predetermined number of times, the process shown in FIG. 4 is terminated.

In step S146, an initial distance $D(t_{ai})$ as an initial value of the relative distance D to a virtual preceding vehicle set for calculation of the performance index KdB, and an initial value KdB $(t_{ai})$ of the performance index KdB are calculated. The initial distance $D(t_{ai})$ is set to 50 m as in the case of the deceleration control process. The initial value KdB $(t_{ai})$ of the performance index KdB is calculated by substituting the initial distance $D(t_{ai})$ and the current relative speed Vr_p calculated as an initial value of the relative speed in step S142 into the foregoing expression (2). The following steps are performed assuming that the virtual preceding vehicle runs at the target speed Vm calculated in step S140.

In step S148, the target value KdB_t of the performance index KdB is calculated. The target value KdB_t, which is a function of the relative distance D, is a tangent of the relational expression of the performance index KdB at the initial distance $D(t_{ai})$. A method of obtaining the tangent is explained in detail below.

The target value KdB_t is a tangent of the relational expression of the performance index KdB at the initial distance $D(t_{ai})$. When the vehicle is accelerating, since the relative speed Vr>0, the performance index relational expression is as shown by the graph in the lower section (the fourth quadrant) of FIG. 6. The direction of the arrow B shows a direction in which the absolute value of the relative speed Vr increases. As seen from this graph, the decrease slope of the performance index KdB becomes steeper with the decrease of the relative distance D, and the absolute value of the performance index KdB becomes larger with the increase of the absolute value of the relative speed Vr. In this graph, also a straight line representing the target values KdB_t is shown. As seen from this straight line, the target value KdB_t decreases at a constant slope with the decrease of the relative distance D when the acceleration control is performed.

The slope of this straight line is determined as follows. In view of that the relative speed Vr<0 while the vehicle is accelerating, the expression (2) is transformed into the following expression (10).

$$KdB = -10 \times \log_{10}\left(\left|-4 \times 10^7 \times \frac{Vr}{D^3}\right|\right) \quad (10)$$

$$= -10 \times \log_{10}(4 \times 10^7) - 10 \times \log_{10} Vr - 10 \times \log_{10}\frac{1}{D^3}$$

$$= -10 \times \log_{10}(4 \times 10^7) - 10 \times \log_{10} Vr + 30 \times \log_{10} D$$

By differentiating the expression (10) with respect to the distance, and substituting the initial distance $D(t_{ai})$, the slope of the tangent can be obtained as the following expression (11).

$$\frac{dKdB}{dD} = \frac{d}{dD}\{-10 \times \log_{10}(4 \times 10^7) - 10 \times \log_{10} Vr + 30 \times \log_{10} D(t_{ai})\} \quad (11)$$

$$= \frac{d}{dD}(30 \times \log_{10} D(t_{ai}))$$

$$= 30 \times \frac{d}{dD}(\log_{10} D(t_{ai}))$$

$$= 30 \times \frac{d}{dD}\left(\frac{\ln D(t_{ai})}{\ln 10}\right)$$

$$= 30 \times \frac{1}{\ln 10} \times \frac{d}{dD}(\ln D(t_{ai}))$$

$$= 30 \times \frac{1}{\ln 10} \times \frac{1}{D(t_{ai})}$$

$$= 13.03 \times \frac{1}{D(t_{ai})}$$

When the initial value of the performance index KdB at the initial distance D(ti) is KdB $(t_{ai})$, the intercept of the tangent is shown by the following expression (12).

$$y\text{-intercept} = KdB(t_{ai}) - 13.03 \times \frac{1}{D(t_{ai})} \times D(t_{ai}) = KdB(t_{ai}) - 13.03 \quad (12)$$

Accordingly, the target value KdB_t of the performance index KdB is obtained as the following expression (13).

$$KdB\_t = 13.03 \times \frac{1}{D(t_{ai})} \times D + KdB(t_{ai}) - 13.03 \quad (13)$$

After the target value KdB_t of the performance index KdB is obtained, the process proceeds to step S150 to calculate the current relative distance D to the virtual preceding vehicle. In step S150, the relative distance D is calculated by adding the variation ΔD(t) of the relative distance D to the initial distance $D(t_{ai})$.

In subsequent step S152, the target relative speed Vr_t is calculated. The target relative speed Vr_t is a function of the relative distance D. A method of calculating the target relative speed Vr_t is explained in detail in the following.

By transforming the performance index relational expression (2), the relative speed Vr when the acceleration control is performed is given by the following expression (14).

$$KdB = -10 \times \log_{10}\left(\left|-4 \times 10^7 \times \frac{Vr}{D^3}\right|\right) \quad (14)$$

$$10^{\left|\frac{KdB}{10}\right|} = \left|4 \times 10^7 \times \frac{1}{D^3} \times Vr\right|$$

$$Vr = 2.5 \times D^3 \times 10^{\left|\frac{KdB}{10}\right| - 8}$$

By substituting the expression (13) into the expression (14), the target relative speed Vr_t can be calculated from the relative distance D in accordance with the following expression (15).

$$Vr\_t = 2.5 \times D^3 \times 10^{\left(\left|\frac{KdB\_t}{10}\right| - 8\right)} \quad (15)$$

$$= 2.5 \times D^3 \times 10^{\left(\frac{\left|13.03 \times \frac{1}{D(t_{ai})} \times D + KdB(t_{ai})-13.03\right|}{10} - 8\right)}$$

$$= 2.5 \times D^3 \times 10^{\left(1.303 \times \frac{1}{D(t_{ai})} \times D + \frac{|KdB(t_{ai})|}{10} - 9.303\right)}$$

By substituting the current relative distance D calculated in step S150 into the expression (15), the target relative speed Vr_t can be obtained.

In subsequent step S154, a target acceleration Ga is calculated in accordance with the following expression (16). In the expression (16), Vr_t is the target relative speed, Vr_p is the current relative speed, and Ta is a predetermined fixed time.

$$Ga = \frac{Vr\_p - Vr\_t}{Ta} \qquad (16)$$

Figure 9:
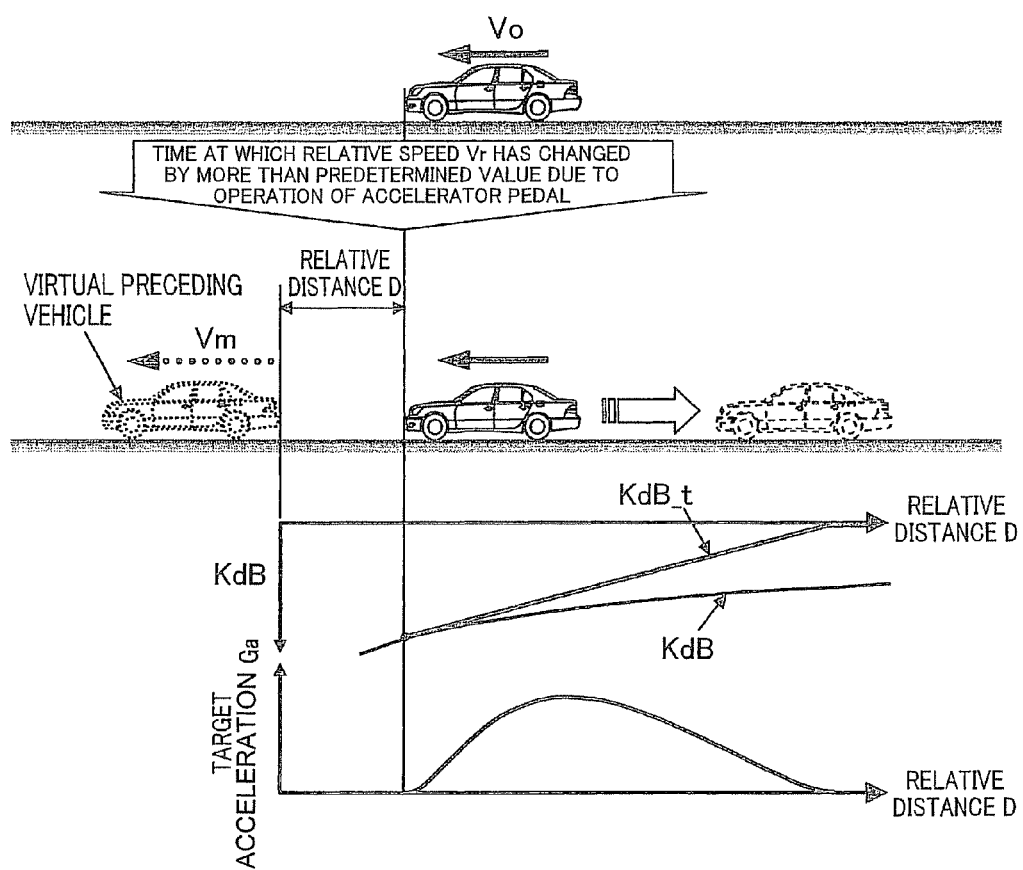
FIG. 9 is a diagram showing variations of a target acceleration Ga and the target value KdB_t of the performance index for approach and alienation with respect to the relative distance D.

FIG. 9 shows variations of the target acceleration Ga and the target value KdB_t of the performance index KdB with respect to the relative distance D. As shown in FIG. 9, the target acceleration Ga is represented by a curve with an upward convexity.

In subsequent step S156, the acceleration force generated by an acceleration apparatus of the vehicle is controlled such that the actual acceleration detected by the G-sensor 30 agrees with the target acceleration Ga calculated in step S154. The accelerating force is determined using a map defining a relationship between the target acceleration Ga and the acceleration force.

In subsequent step S158, it is determined whether or not a control termination condition is satisfied. In this embodiment, the control termination condition is that the relative speed Vr_p, that is, the difference between the vehicle speed Vo and the target vehicle speed Vm becomes smaller than the predetermined speed (1 km/h). If the determination result in step S158 is negative, the process returns to step S148 to continue the acceleration control. If the determination result in step S158 is negative, the process is terminated.

Figure 10:
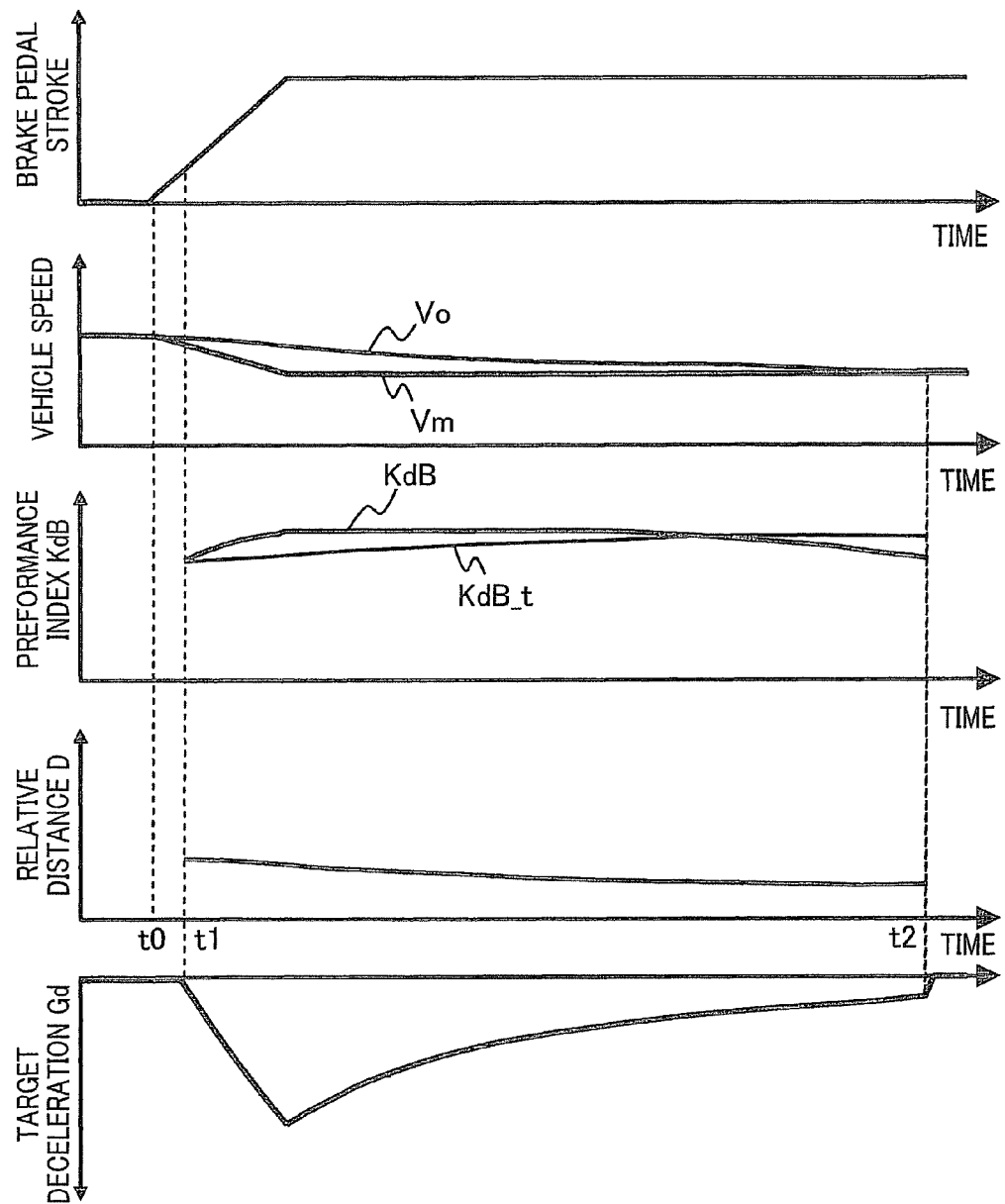
FIG. 10 is a graph showing variations with time of various values related to the deceleration control process.
Figure 11:
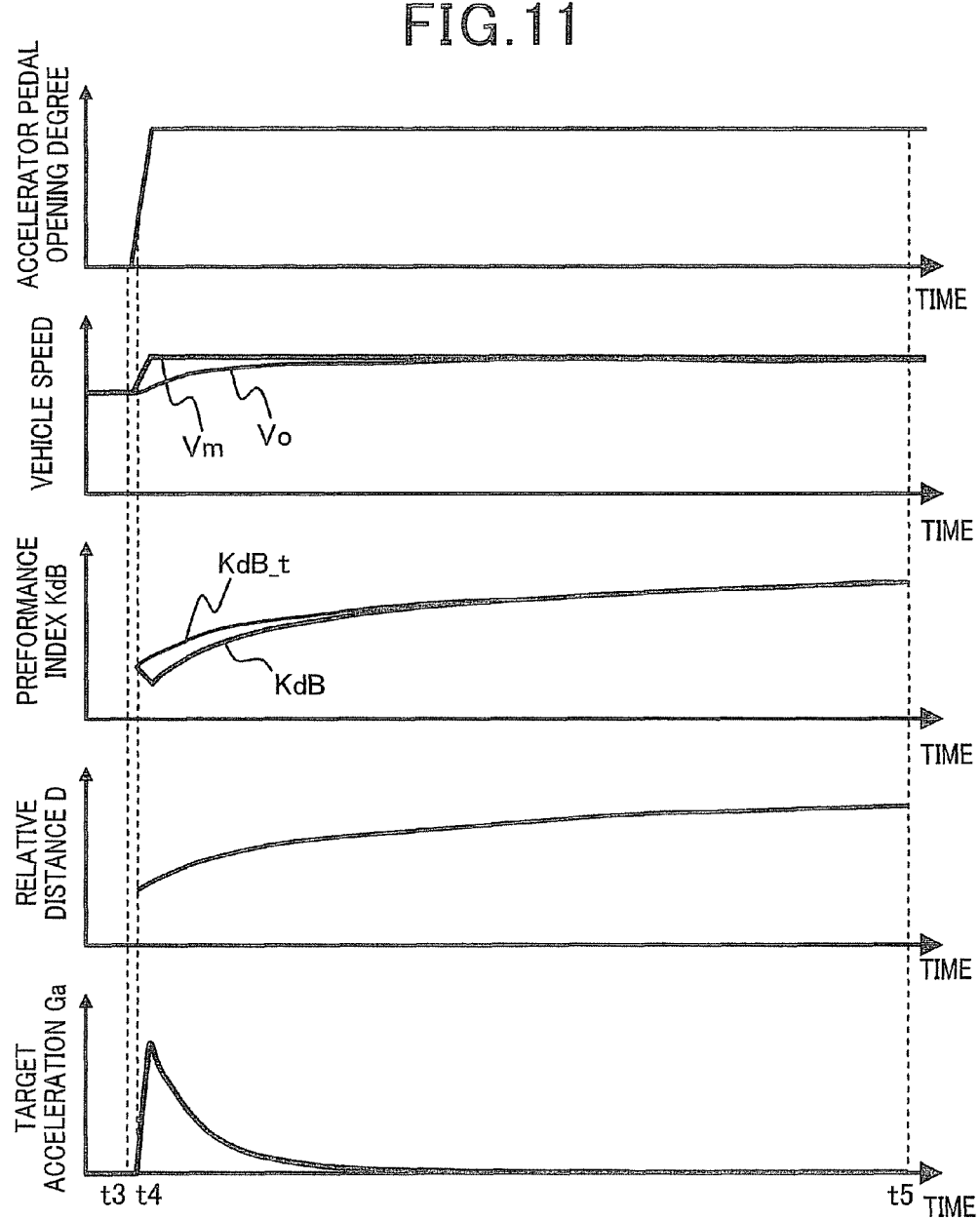
FIG. 11 is a graph showing variations with time of various values related to the acceleration control process.

FIG. 10 is a graph showing variations with time of various values related to the deceleration control, and FIG. 11 is a graph showing variations with time of the various values related to the acceleration control. In the following, examples of the deceleration control and the acceleration control performed in this embodiment are explained with reference to these figures. First, an example of the deceleration control is explained with reference to FIG. 10.

In this example, the vehicle driver starts to press the brake pedal at time t0, causing the brake pedal stroke to increases as a result of which the relative speed Vr_p exceeds the threshold TH at time t1. At this time, the initial distance $D(t_{bi})$ is set, and the relative distance D starts to be calculated repeatedly. During the deceleration control, the target relative speed Vr_t is calculated repeatedly in accordance with the expression (8), the target deceleration Gd is calculated based on the target relative speed Vr_t and the current relative speed Vr_p, and the actual deceleration is controlled to agree with the target deceleration Gd. By such a control, the vehicle speed Vo smoothly approaches the target speed Vm. When the vehicle speed Vo reaches near the target speed Vm (Vm+1 km/h) at time t2, the deceleration control is terminated. Although the performance index KdB is larger than its target value KdB_t at the beginning of the period from time t1 to time t2, it decreases below the target value KdB_t and the relative distance D becomes smaller gradually during this period.

Next, an example of the acceleration control is explained with reference to FIG. 11. In this example, the vehicle driver starts to press the accelerator pedal at time t3, causing the accelerator pedal opening degree to increases as a result of which the relative speed Vr_p exceeds the threshold TH at time t4. At this time, the initial distance $D(t_{ai})$ is set, and the relative distance D starts to be calculated repeatedly. During the acceleration control, the target relative speed Vr_t is calculated repeatedly in accordance with the expression (15), the target acceleration Ga is calculated based on the target relative speed Vr_t and the current relative speed Vr_p, and the actual acceleration is controlled to agree with the target acceleration Ga. By such a control, the vehicle speed Vo smoothly approaches the target speed Vm. When the vehicle speed Vo reaches near the target speed Vm (Vm−1 km/h) at time t5, the acceleration control is terminated. During the period from time t4 to time t5, the performance index KdB approaches its target value KdB_t, and the relative distance D becomes larger gradually.

According to the embodiment described above, when the speed control start condition (the deceleration control start condition, or acceleration control start condition) is satisfied, a virtual preceding vehicle running at the target speed Vm is set at the initial distance $D(t_{bi})$ or $D(t_{ai})$ ahead of the own vehicle (steps S118 or S146). Subsequently, the initial value $KdB(t_{bi})$ or $KdB(t_{ai})$ of the performance index KdB at the initial distance $D(t_{bi})$ or $D(t_{ai})$ is calculated based on the initial distance $D(t_{bi})$ or $D(t_{ai})$ and the target speed Vm (steps S118 or S146). Further, the relative distance D is calculated repeatedly based on the time elapsed from the time when the speed control start condition was satisfied, the current relative speed Vr_p and the initial distance $D(t_{bi})$ or $D(t_{ai})$ (steps S122 or S150). Further, the target relative speed Vr_t is calculated repeatedly based on the initial distance $D(t_{bi})$ or $D(t_a i)$, the initial values $KdB(t_{bi})$ or $KdB(t_{ai})$ of the performance index KdB and the relative distance D (steps S124 or S152). The current relative speed Vr_p is set to the difference between the vehicle speed Vo and the target speed Vm. The speed control is performed based on the difference between the target relative speed Vr_t and the actual relative speed Vr_p (steps S128 or S156). Accordingly, even when no preceding vehicle is present, it is possible to perform the vehicle speed control which is smooth and comfortable for the vehicle driver.

Modification 1

In the above embodiment, when the accelerator pedal is operated, the target speed Vm is set in accordance with the relationship shown in FIG. 8, and it is determined whether the difference between the target speed Vm and the actual vehicle speed Vo (the relative speed Vr_p) has varied more than the threshold TH. If this determination is affirmative, the acceleration control is started, and otherwise, this determination is made again. In modification 1, even when this determination is negative, the acceleration control is performed so that the actual acceleration agrees with an acceleration set differently from the target acceleration (referred to as "set acceleration Gb" in the following) if the pedal-related variable is in an increasing trend.

The pedal-related variable may be the accelerator pedal opening degree, or the stroke amount of the accelerator pedal. In the following, a case where the accelerator pedal opening degree is used as the pedal-related variable is explained with reference to FIG. 12.

Figure 12:
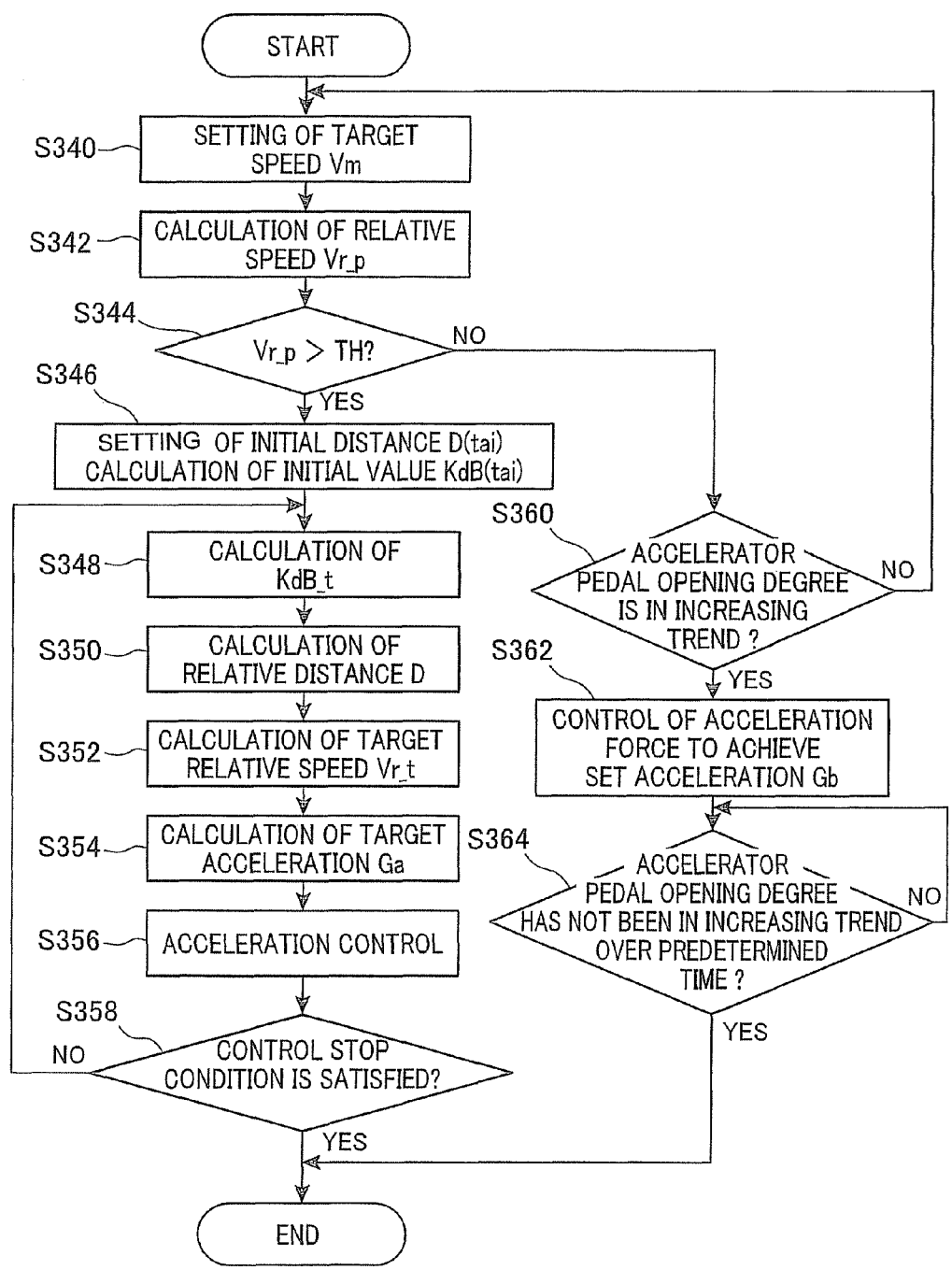
FIG. 12 is a flowchart showing a modification of the acceleration control process performed if the determination result in step S106 of the speed control shown in FIG. 2 is affirmative (when an accelerator operation is performed)

FIG. 12 shows an acceleration control process performed when the determination result in step S106 shown in FIG. 2 is affirmative.

The operation from steps S340 to S342 shown in FIG. 12 is the same as the operation from steps S140 to S142 shown in FIG. 4.

In step S344, it is determined whether or not the current relative speed Vr_p calculated in step S342 has varied more than the threshold TH. This threshold TH is set to 5 km/h, for example.

If the determination result in step S344 is affirmative, the process proceeds to step S346 to start the acceleration control. The operation from steps S346 to S358 shown in FIG. 12 is the same as the operation from steps S146 to S158 shown in FIG. 4.

If the determination result in step S344 is negative, the process proceeds to step 360 to determine whether or not the pedal-related variable is in an increasing trend. Here, if the accelerator pedal opening degree detected at the current time is larger than that detected at the previous time, it is determined that the pedal-related variable is in an increasing trend, and otherwise it is determined that the pedal-related variable is not in an increasing trend.

If the determination result in step S360 is affirmative, the process proceeds to step S362. If the determination result in step S360 is negative, the process returns to step S340 to update the target speed Vm and the current relative speed Vr_p, and then proceeds to step S344 again.

Step S362 starts an operation to control the acceleration force generated by the acceleration apparatus such that the actual acceleration force detected by the G-sensor 30 agrees with the set acceleration Gb. Thereafter, the process proceeds to step S364. The acceleration force to be generated is determined based on the difference between the set acceleration Gb and the actual acceleration, for example.

Figure 13:
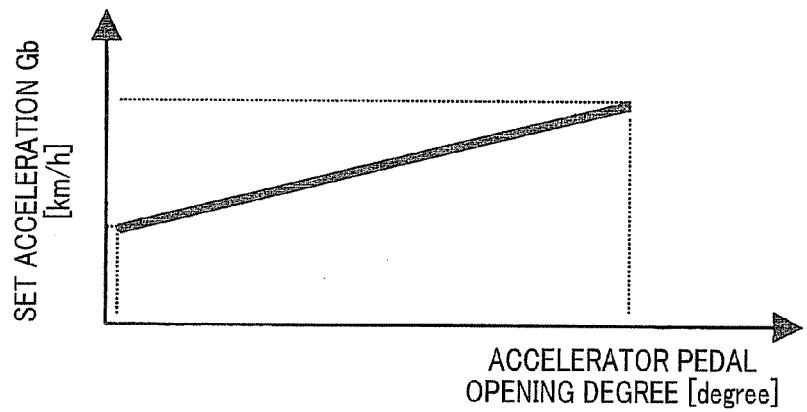
FIG. 13 is a graph showing a relationship between the accelerator pedal opening degree and a set acceleration Gb.

The set acceleration Gb may be a fixed value. However, it is preferable the set acceleration Gb is variable depending on the accelerator pedal opening degree. In this case, the set acceleration Gb may be determined based on the relationship between the accelerator pedal opening degree and the set acceleration Gb as shown in FIG. 13, and the current accelerator pedal opening degree.

In step S364, it is determined whether or not the accelerator pedal opening degree has not been in an increasing trend over a predetermined time. Here, if the accelerator pedal opening degree did not increase once during the predetermined time, it is determined that the accelerator pedal opening degree has not been in an increasing trend over the predetermined time, and otherwise, it is determined that the accelerator pedal opening degree has been in an increasing trend over the predetermined time.

If the determination result in step S364 is affirmative, the acceleration control process is terminated. Thereafter, the speed control may perform step S100 shown in FIG. 2, while keeping the vehicle to run at 0 acceleration. If the determination result in step S364 is negative, the process performs step S364 again to continue the acceleration control so that the actual acceleration agrees with the set acceleration Gb. Although not shown in FIG. 12, if steps S342 and S344 have been performed a predetermined number of times, the process shown in FIG. 12 is terminated.

According to the above modification 1, even when the current relative speed Vr_p has not varied more than the threshold TH (that is, the acceleration control start condition is not satisfied), it is possible to control the acceleration apparatus such that the vehicle accelerates at the set acceleration Gb set differently from the target acceleration, if the vehicle driver keep depressing the accelerator pedal, and accordingly the pedal-related variable is in an increasing trend. Hence, according to modification 1, it is possible to eliminate a dead zone where the vehicle does not respond to the vehicle driver's operation of the accelerator pedal.

Incidentally, modification 1 may be modified not to continue the operation to stop the control to achieve the set acceleration Gb and then to keep the vehicle to run at 0 acceleration after the accelerator pedal opening degree leaves the increasing trend (referred to as "set-acceleration-control stop operation" hereinafter).

Figure 14:
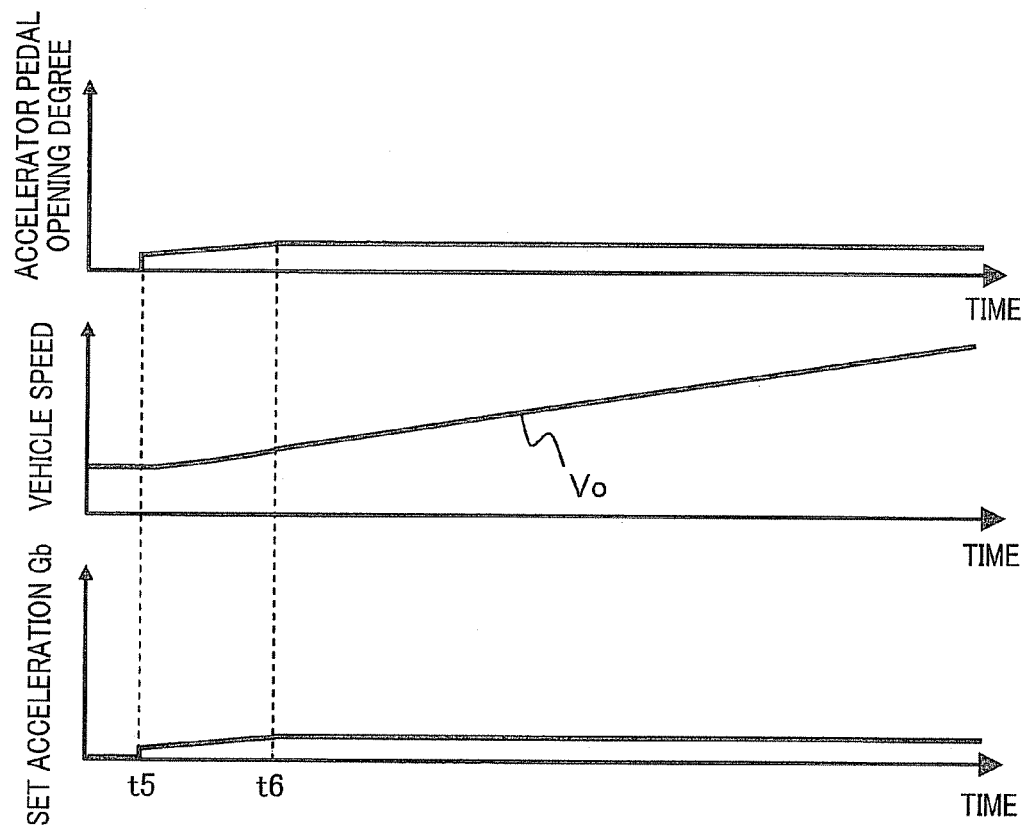
FIG. 14 is a graph showing variations of various values related to an example of control for achieving the set acceleration Gb.

Next, examples of the control to achieve the set acceleration Gb is explained with reference to FIGS. 14 and 15. FIGS. 14 and 15 are graphs showing variations with time of various values related to the acceleration control to achieve the set acceleration Gb. The examples shown in FIGS. 14 and 15 are directed to cases where the acceleration control start condition is not satisfied although the vehicle driver lightly depresses the accelerator pedal again after the accelerator pedal is returned. More specifically, the example shown in FIG. 14 is directed to the case where the set-acceleration-control stop operation is not performed, and the example shown in FIG. 15 is directed to the case where the set-acceleration-control stop operation is performed.

First, the example shown in FIG. 14 is explained. In this example, the vehicle drive starts depressing the accelerator pedal at time t5 after the accelerator pedal is returned. As a result, the accelerator pedal opening degree increases gradually, and the set acceleration Gb increases with the increase of the accelerator pedal opening degree thereafter. The acceleration force generated by the acceleration apparatus gradually increases with the increase of the set acceleration Gb, as a result of which the speed of the vehicle increases. Although the depression amount of the accelerator pedal is fixed at time t6, the vehicle speed continues to increase because the set acceleration Gb is set constant to continue to generate a constant acceleration force.

Next, the example shown in FIG. 15 is explained. In this example, the vehicle driver starts depressing the accelerator pedal at time t7 after the accelerator pedal is returned. As a result, the accelerator pedal opening degree gradually increases, and the set acceleration Gb increases with the increase of the accelerator pedal opening degree. The acceleration force generated by the acceleration apparatus gradually increases with the increase of the set acceleration Gb, as a result of which the speed of the vehicle increases. After the depression amount of the accelerator pedal is kept constant over a predetermined time (from time t8 to t9), the set-acceleration-control stop operation is started, as a result of which the speed of the vehicle speed is kept at the speed at the time when the set-acceleration-control stop operation is started, because acceleration of the vehicle is stopped even when the accelerator pedal is not returned.

As explained above, by performing the set-acceleration-control stop operation, it becomes possible to stop the vehicle from accelerating when the vehicle driver does not intend to accelerate the vehicle.

This makes it possible to provide further smooth and comfortable speed control for the vehicle driver.

Modification 2

Figure 5:
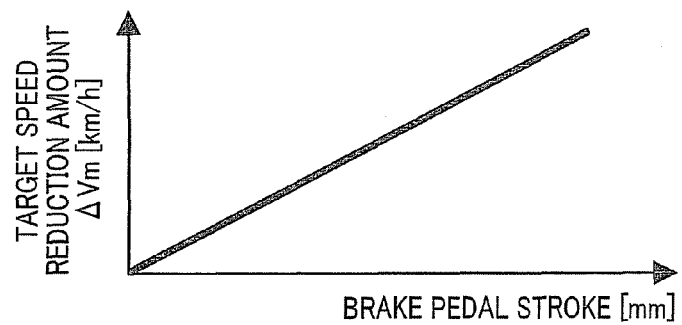
FIG. 5 is a diagram showing a pre-stored relationship between a brake pedal stroke and a speed reduction target value ΔVm.

In the above embodiment, the target speed Vm is set based on the relationship shown in FIG. 5 or 8 when the accelerator pedal is operated, and the operation steps after the steps for setting the initial distance $D(t_{bi})$ or $D(t_{ai})$ are performed based on the difference between the target speed Vm and the actual vehicle speed Vo (that is, the relative speed Vr_p). In modification 2, the operation steps after the steps for setting the initial distance $D(t_{bi})$ or $D(t_{ai})$ are performed even when the target speed Vm does not change, that is, even when the depression amount of the accelerator pedal is constant, if the vehicle speed has varied by more than a predetermined value. To implement this, the vehicle speed Vo detected in step S114 or S142 may be used to calculate the relative speed Vr_p.

Modification 3.

The above embodiment may be modified such that when the vehicle is provided with a manual switch to enable the vehicle driver to manually set the target speed Vm, the speed control may be performed based on the target speed Vm set by this switch.

Modification 4

In the above embodiment, each of the initial distances $D(t_{bi})$ and $D(t_{ai})$ is a constant value. However, they may be calculated in accordance with the following expression (17) in which the performance index KdB is compensated with respect to the target speed Vm, and this target speed Vm. In the expression (17) a is a constant number.

$$KdB\_c(a) = 10 \times \log_{10}\left(\left|-4 \times 10^7 \times \frac{Vr - a \times Vm}{D^3}\right|\right) \mathrm{sgn}(-Vr) \quad (17)$$

The threshold to start the speed control performed using the compensated performance index KdB_c can be expressed by the following expression (18).

$$KdB\_c(a) - b \times \log_{10} D - c = 0 \quad (18)$$

The expression (17) can be transformed into the following expression (19).

$$Vr = -2.5 \times D^3 \times 10^{\left(\frac{KdB\_c}{10} - 8\right)} + a \times Vm \quad (19)$$

By substituting the expression (19) into the expression (18), the following expression (20) can be obtained.

$$Vr = -2.5 \times D^3 \times 10^{\left(\frac{b \times \log_{10} D + c}{10} - 8\right)} + a \times Vm \quad (20)$$

The relative distance D when the difference between the vehicle speed Vo and the target speed Vm is 0, that is, when the relative speed Vr=0, is given by the following expression (21).

In modification 4, the distance calculated in accordance with the expression (21) is used as the initial distance $D(t_{bi})$ or $D(t_{ai})$.

$$2.5 \times D^3 \times 10^{\left(\frac{b \times \log_{10} D + c}{10} - 8\right)} - a \times Vm = 10^{\left(\frac{b \times \log_{10} D + c}{10} - 8\right)} \quad (21)$$

$$= \frac{a \times Vm}{2.5 \times D^3} = \frac{\frac{a}{2.5} \times Vm}{D^3}$$

$$\frac{b \times \log_{10} D + c}{10} - 8 = \log_{10} \frac{a}{2.5} + \log_{10} Vm - 3 \times \log_{10} D$$

$$(b + 30) \times \log_{10} D = 80 + 10 \times \log_{10} \frac{a}{2.5} + 10 \times \log_{10} Vm - c$$

$$\log_{10} D = \frac{80 + 10 \times \log_{10} \frac{a}{2.5} + 10 \times \log_{10} Vm - c}{b + 30}$$

$$D = 10^{\frac{80 + 10 \times \log_{10} \frac{a}{2.5} + 10 \times \log_{10} Vm - c}{b + 30}} = Dt$$

$$Dt = 10^{\frac{80 + 10 \times \log_{10} \frac{a}{2.5} + 10 \times \log_{10} Vm - c}{b + 30}}$$

Modification 5

Modification 5 differs from modification 4 in that instead of the expression (17), the following expression (22) in which the performance index KdB is compensated with respect to the vehicle speed Vo at the time when the speed control is started is used. Accordingly, in modification 5, the distance calculated in accordance with the following expression (23) is used as the initial distance $D(t_{bi})$ or $D(t_{ai})$.

$$KdB\_c(a) = 10 \times \log_{10}\left(\left|4 \times 10^7 \times \frac{Vr - a \times Vo}{D^3}\right|\right) \quad (22)$$

$$D = 10^{\frac{80 + 10 \times \log_{10} \frac{a}{2.5} + 10 \times \log_{10} Vo - c}{b + 30}} \quad (23)$$

Modification 6

In the above embodiment, the relative speed Vr_t is calculated in accordance with the expressions (8) or (15) using the performance index KdB. However, in modification 6, the relative speed Vr_t is calculated from the compensated performance index KdB_c. That is, in modification 6, the relative speed obtained by substituting the relative distance D and the target sped Vm into the expression (20) is used as the target relative speed Vr_t. Incidentally, the target relative speed Vr_t calculated as above may be used for both or one of the acceleration control and the deceleration control.

Modification 7

In the above embodiment, the target relative speed Vr_t is calculated by substituting the expression (13) to calculate the target value KdB_t of the performance index KdB into the expression (14) to calculate the relative speed Vr from the performance index KdB and the relative distance D. In modification 7, instead of the expression (13), there is used an expression representing the line connecting a first point determined by the initial distance $D(t_{ai})$ and the performance index $KdB(t_{ai})$ at this initial distance $D(t_{ai})$, and a second point determined by the target distance Dt when the performance index KdB is 0. The target distance Dt can be obtained by substituting KdB=0 and Vr=0 into the expression (10).

It is a matter of course that various modifications can be made to the above embodiment.

For example, instead of the accelerator pedal opening degree, the throttle valve opening degree may be detected as the pedal-related variable. For another example, instead of the brake pedal stroke, the brake pressure may be detected as the pedal-related variable.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-use speed control apparatus configured to perform speed control of an own vehicle on which the vehicle-use speed control apparatus is mounted in accordance with a performance index for approach and alienation representing a state of approach and alienation between the own vehicle and a preceding vehicle, and a relational expression of performance index for approach and alienation, the relational expression showing a relationship between a following distance to the preceding vehicle and an approach speed between the own vehicle and the preceding vehicle, the relational expression making an absolute value of the performance index to increase with increase of the approach speed, and making a slope of the performance index steeper with a decrease of the following distance for a same value of the approach speed, the vehicle-use speed control apparatus comprising:

means for setting a target speed of the own vehicle based on a pedal-related variable related to an operation amount of a pedal operated by a driver of the own vehicle to accelerate or decelerate the own vehicle;

means for repeatedly calculating a current value of a relative speed between the target speed and a current speed of the own vehicle;

means for calculating an initial value of the performance index based on the current value of the relative speed, an initial following distance to a virtual preceding vehicle and the performance index when a speed control start condition that the relative speed exceeds a predetermined value is satisfied;

means for repeatedly calculating a current value of the following distance to the virtual preceding vehicle based on the current value of the relative speed, a time elapsed from a time when the predetermined speed control start condition was satisfied and the initial following distance to the virtual preceding vehicle;

means for repeatedly calculating a target value of the relative speed as a target relative speed based on the current value of the following distance, the initial value of the performance index and the initial following distance to the virtual preceding vehicle;

means for performing control to change a speed of the own vehicle by accelerating or decelerating the own vehicle based on the target relative speed and the current value of the relative speed;

means for calculating an initial following distance by substituting the target speed set by the means for setting the target speed into an expression derived from a threshold expression showing a relationship between the following distance and a threshold of a compensated version of the performance index compensated with respect to a speed of the own vehicle at a time when the speed control start condition is satisfied, and an expression for calculating the compensated version of the performance index based on the following distance, the target speed and the relative speed; wherein the virtual preceding vehicle is assumed to run at the target speed set based on the pedal-related variable related to an operation amount of the pedal operated by the driver.

2. The vehicle-use speed control apparatus according to claim 1, wherein the relational expression includes an acceleration control-use relational expression which makes a decrease slope of the performance index steeper with a decrease of the following distance, the predetermined speed control start condition includes an acceleration control start condition, the means for calculating the initial value of the performance index is configured to calculate, when the acceleration control start condition is satisfied, the initial value of the performance index based on the current value of the relative speed at a time when the acceleration control start condition is satisfied, the initial following distance to the virtual preceding vehicle and the acceleration control-use relational expression, the vehicle-use speed control apparatus further comprises means for calculating a target acceleration based on the target relative speed and the current value of the relative speed, and the performing means is configured to control an acceleration force generated by an acceleration apparatus of the own vehicle such that an acceleration of the own vehicle agrees with the target acceleration.

3. The vehicle-use speed control apparatus according to claim 1, wherein the relational expression includes a deceleration control-use relational expression which makes an increase slope of the performance index steeper with a decrease of the following distance, the predetermined speed control start condition includes a deceleration control start condition, means for calculating the initial value of the performance index is configured to calculate the initial value of the performance index based on the current value of the relative speed at a time when the deceleration control start condition is satisfied, the initial following distance to the virtual preceding vehicle and the deceleration control-use relational expression, the vehicle-use speed control apparatus further comprises means for calculating a target deceleration based on the target relative speed and the current value of the relative speed, and the performing means is configured to control a deceleration force generated by a brake apparatus of own vehicle such that a deceleration of the own vehicle agrees with the target deceleration.

4. The vehicle-use speed control apparatus according to claim 1, wherein the own vehicle is equipped with a manual switch installed at a position operable by a driver of the own vehicle to set a speed of the own vehicle, and the means for setting the target speed uses the speed set by the manual switch as the target speed.

5. The vehicle-use speed control apparatus according to claim 1, wherein the initial following distance is a predetermined fixed distance.

6. The vehicle-use speed control apparatus according to claim 1, wherein the means for calculating the initial following distance substitutes the target speed set by the means for setting the target speed into an expression derived from a threshold expression showing a relationship between the following distance and a threshold of a compensated version of the performance index compensated with respect to the target speed, and an expression for calculating the compensated version of the performance index based on the following distance, the target speed and the relative speed.

7. The vehicle-use speed control apparatus according to claim 1, wherein the means for repeatedly calculating the target value of the relative speed is configured to repeatedly calculate the target value of the relative speed by substituting the target speed set by the means for setting the target speed and the following distance calculated by the means for repeatedly calculating the current value of the following distance to an expression derived from a threshold expression showing a relationship between the following distance and a threshold of a compensated version of the performance index compensated with respect to the target speed, and an expression for calculating the compensated version of the performance index based on the following distance, the target speed and the relative speed.

8. A vehicle-use speed control apparatus configured to perform speed control of an own vehicle on which the vehicle-use speed control apparatus is mounted in accordance with a performance index for approach and alienation representing a state of approach and alienation between the own vehicle and a preceding vehicle, and a relational expression of performance index for approach and alienation, the relational expression showing a relationship between a following distance to the preceding vehicle and an approach speed between the own vehicle and the preceding vehicle, the relational expression making an absolute value of the performance index to increase with increase of the approach speed, and making a slope of the performance index steeper with a decrease of the following distance for a same value of the approach speed, the vehicle-use speed control apparatus comprising:

means for setting a target speed of the own vehicle;

means for repeatedly calculating a current value of a relative speed between the target speed and a current speed of the own vehicle;

means for calculating an initial value of the performance index based on the current value of the relative speed, an initial following distance to a virtual preceding vehicle and the performance index when a predetermined speed control start condition is satisfied;

means for repeatedly calculating a current value of the following distance to the virtual preceding vehicle based on the current value of the relative speed, a time elapsed from a time when the predetermined speed control start condition was satisfied and the initial following distance to the virtual preceding vehicle;

means for repeatedly calculating a target value of the relative speed as a target relative speed based on the current value of the following distance, the initial value of the performance index and the initial following distance to the virtual preceding vehicle;

means for performing speed control of the own vehicle based on the target relative speed and the current value of the relative speed;

means for calculating an initial following distance by substituting the target speed set by the means for setting the target speed into an expression derived from a threshold expression showing a relationship between the following distance and a threshold of a compensated version of the performance index compensated with respect to a speed of the own vehicle at a time when the speed control start condition is satisfied, and an expression for calculating the compensated version of the performance index based on the following distance, the target speed and the relative speed; wherein the relational expression includes an acceleration control-use relational expression which makes a decrease slope of the performance index steeper with a decrease of the following distance, the predetermined speed control start condition includes an acceleration control start condition that the relative speed between the target speed and the current speed of the own vehicle exceeds a predetermined value, the means for calculating the initial value of the performance index is configured to calculate, when the acceleration control start condition is satisfied, the initial value of the performance index based on the relative speed at a time when the acceleration control start condition is satisfied, the initial following distance to the virtual preceding vehicle and the acceleration control-use relational expression, the means for setting the target speed calculates the target speed based on a pedal-related variable related to an operation amount of a pedal operated by a driver of the own vehicle to accelerate or decelerate the own vehicle, the target relative speed and the current value of the relative speed, the vehicle-use speed control apparatus further comprises means for calculating a target acceleration based on the target relative speed and the current value of the relative speed, the performing means controls an acceleration force generated by an acceleration apparatus of the own vehicle such that an acceleration of the own vehicle agrees with the target acceleration when the acceleration control start condition is satisfied, and controls the acceleration force generated by the acceleration apparatus such that an acceleration of the own vehicle agrees with a set acceleration set differently from the target acceleration when the acceleration control start condition is not satisfied and the pedal-related variable is in an increasing trend, and the virtual preceding vehicle is assumed to run at the target speed set based on the pedal-related variable related to an operation amount of the pedal operated by the driver.

9. The vehicle-use speed control apparatus according to claim 8, wherein the set acceleration is set variably depending on the pedal-related variable.

10. The vehicle-use speed control apparatus according to claim 8, wherein the performing means stops control of the acceleration force when the pedal-related variable has left the increasing trend over a predetermined time from start of the control of the acceleration force.

* * * * *